E. C. DOZIER.
OILER ATTACHMENT FOR SHAFT BEARINGS.
APPLICATION FILED OCT. 16, 1908.
916,423.
Patented Mar. 30, 1909.
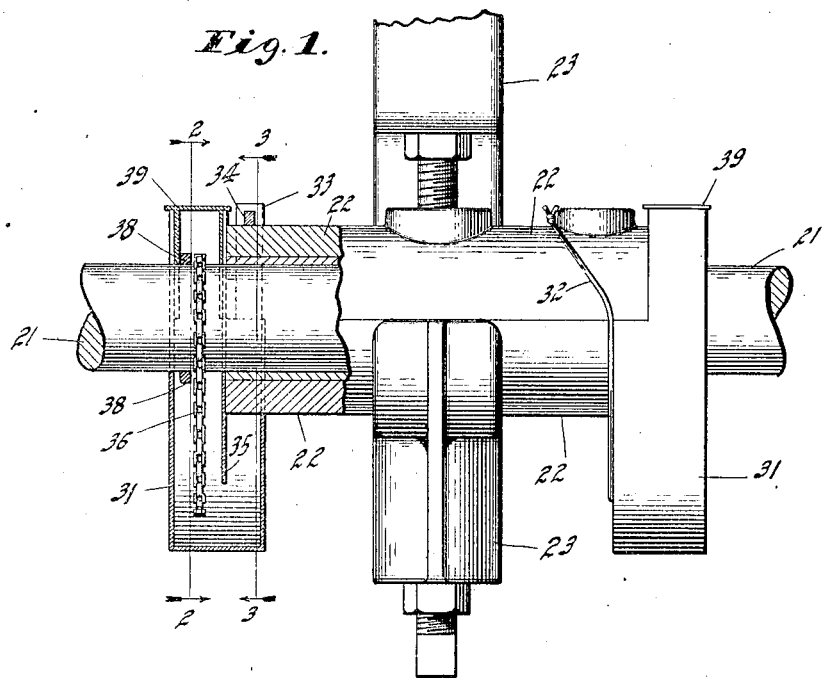
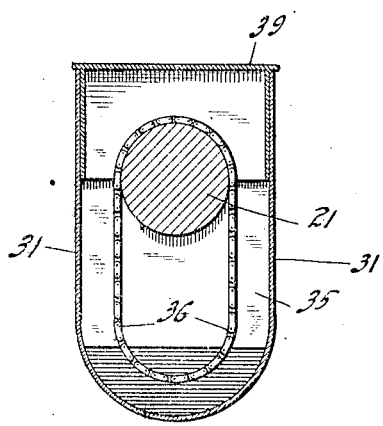
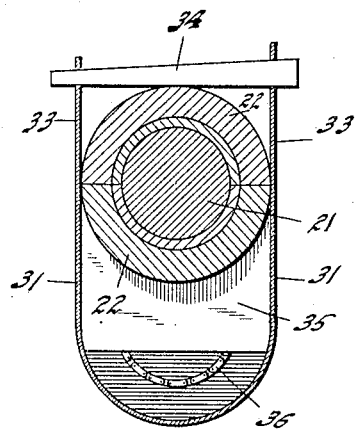
Witnesses
Frank A. Fahl
Thomas W. McMeans
Inventor
Edwin C. Dozier,
By Bradford & Hood,
Attorneys.

UNITED STATES PATENT OFFICE.

EDWIN C. DOZIER, OF RICHMOND, INDIANA, ASSIGNOR OF ONE-HALF TO FRANK S. EVANS, OF INDIANAPOLIS, INDIANA.

OILER ATTACHMENT FOR SHAFT-BEARINGS.

No. 916,423.          Specification of Letters Patent.         Patented March 30, 1909.

Application filed October 16, 1908. Serial No. 458,055.

*To all whom it may concern:*

Be it known that I, EDWIN C. DOZIER, a citizen of the United States, residing at Richmond, in the county of Wayne and State of Indiana, have invented certain new and useful Improvements in Oiler Attachments for Shaft-Bearings, of which the following is a specification.

It is frequently desirable to supply a means whereby a lubricant may be automatically delivered to the bearings of shafts where the bearings are of the ordinary sort and not originally provided with such means.

My present invention consists in an independent oiling device adapted to be attached to such common bearings, as will be hereinafter more particularly described and claimed.

Referring to the accompanying drawings, which are made a part hereof, and on which similar reference characters indicate similar parts, Figure 1 is a view partially in side elevation and partially in longitudinal vertical section of a bearing containing a fragment of a shaft and provided with oilers embodying my present invention, and Figs. 2 and 3 transverse sectional views at the points indicated respectively by the dotted lines 2 2 and 3 3 in Fig. 1.

An ordinary shaft 21 is shown as mounted in a common box or bearing 22, and this, in turn, is shown as supported by any suitable hanger or support 23.

My improved oiler consists in a receptacle 31 formed to fit upon the end of box or bearing 22 and extend up around shaft 21. Said receptacle may be supported upon the box 22 by any suitable means, as by a hanger, which is shown as consisting of wire 32 upon the oiler at one end of the box or bearing, and as consisting of straps 33 upon the oiler and a suitable wedge 34 uniting them at the other end of the bearing.

The oiler structure is divided into two chambers by a central partition 35. The inner chamber is directly beneath the end of the box 22, so that any oil which may drop from the end of said box will fall into said chamber. The other chamber is outside the end of the box and extends up around the shaft 21, and within this chamber a traveling lubricator-elevating device, as chain 36, is placed, by means of which (as the shaft revolves) a supply of lubricant is constantly elevated onto the shaft and passes thence into the bearing. The two chambers open into each other at the bottom, so that the lubricant which descends from the end of the box into the inner chamber may pass to the outer chamber and be used over again. Within that portion of the outer wall of the attachment which extends up around the shaft I place an annular ring 38, which may be a band of rubber, or a piece of small rubber tubing or packing, having the ends brought together and suitably connected, and which acts as a dam encircling the shaft to prevent the lubricant from flowing outwardly from the box longitudinally of the shaft. When the device is in place it is closed by a suitable cover 39, which may be removed for the introduction of the lubricant.

By the means described I am able to provide old shaft bearings of the ordinary sort with an automatic lubricator, and at very slight expense. As will be readily understood this device is both easily applied and as easily removed.

Having thus fully described my said invention, what I claim as new, and desire to secure by Letters Patent, is:—

1. The combination, with a shaft and its bearing, of a lubricator structure adapted to be secured to the end of the bearing and extend up around the shaft, and a traveling lubricant elevator contained within said structure, said structure being divided into two chambers one of which is positioned below the end of the bearing and the other of which is beyond the bearing and within which the traveling lubricator elevator is contained.

2. The combination, with a shaft and its bearing, of a lubricator structure adapted to be secured to the end of the bearing and extend up around the shaft, a traveling lubricant-elevator contained within said structure, and a closely-fitting dam encircling the shaft just inside of but not in contact with the outer wall of the chamber within which the lubricant-elevator travels.

In witness whereof, I have hereunto set my hand and seal at Indianapolis, Indiana, this thirteenth day of October, A. D. one thousand nine hundred and eight.

EDWIN C. DOZIER. [L. S.]

Witnesses:
    FRANK S. EVANS,
    THOMAS W. MCMEANS.